United States Patent [19]

Kaneko et al.

[11] 3,968,503

[45] July 6, 1976

[54] SHUTTER FOR PHOTOGRAPHIC CAMERAS WITH A FLASH EQUIPMENT

[75] Inventors: Hirokazu Kaneko; Hiroo Nakano, both of Yokohama, Japan

[73] Assignee: Ricoh Co., Ltd., Japan

[22] Filed: May 23, 1975

[21] Appl. No.: 580,214

[30] Foreign Application Priority Data

May 23, 1974  Japan............................ 49-58205[U]
May 23, 1974  Japan............................ 49-58206[U]

[52] U.S. Cl.................................... 354/33; 354/45
[51] Int. Cl.²........................................ G03B 7/16
[58] Field of Search................................ 354/33, 45

[56] References Cited

UNITED STATES PATENTS

| | | | |
|---|---|---|---|
| 3,616,735 | 11/1971 | Bresson | 354/33 |
| 3,883,768 | 8/1972 | Kitai | 354/33 |

*Primary Examiner*—Monroe H. Hayes
*Attorney, Agent, or Firm*—McGlew and Tuttle

[57] ABSTRACT

A flash emitter is automatically actuated upon releasing the shutter when the brightness of an object to be photographed is below a predetermined level. Upon the flashwise photographing, the diaphragm aperture is also automatically controlled in accordance with the distance between the camera and the object.

3 Claims, 3 Drawing Figures

ANGLE OF ROTATION OF FLYWHEEL

SHUTTER FOR PHOTOGRAPHIC CAMERAS WITH A FLASH EQUIPMENT

BACKGROUND OF THE INVENTION

This invention relates to shutters for photographic cameras with a flash equipment and more particularly it is concerned with a shutter of the type described in which a flash emitter is automatically actuated upon releasing the shutter when the brightness of an object to be photographed is below a predetermined level.

SUMMARY OF THE INVENTION

The present invention has as its object the provision of a shutter for photographic cameras with a flash equipment in which a flash emitter is automatically actuated, upon releasing the shutter, when the brightness of an object to be photographed is below a predetermined level.

Another object of the invention is the provision of a shutter for photographic cameras with a flash equipment in which, upon flashwise photographing, the diaphragm aperture is automatically controlled in accordance with the distance between the camera and the object to be photographed.

Additional and other objects and features of the invention will become evident from the description set forth hereinafter when considered in conjunction with the accompanying drawings.

DETAILED DESCRIPTION OF THE PREFERRED EMBODIDMENTS

Figure 1:
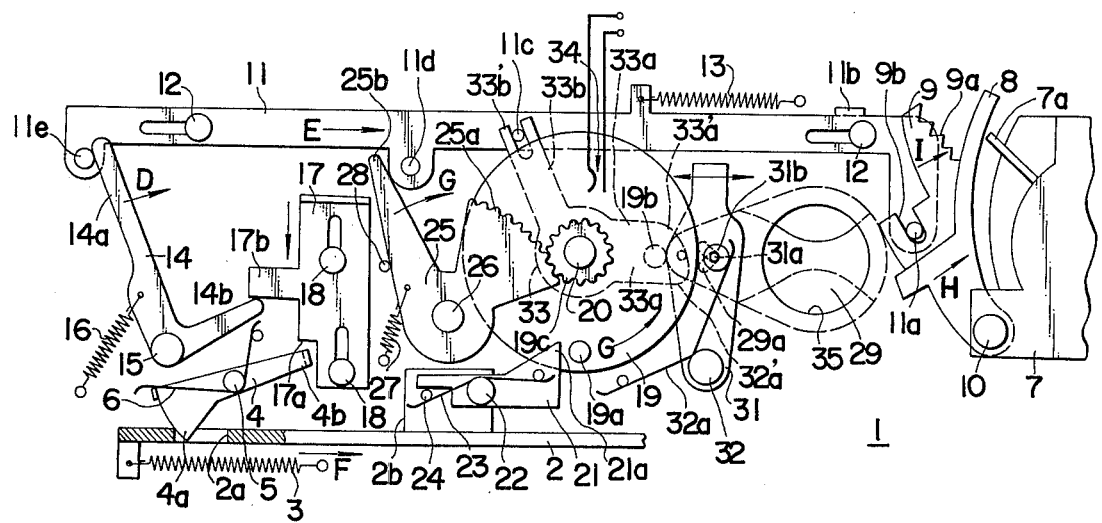
FIG. 1 is a plan view of the essential portions of the shutter for photographic cameras comprising one embodiment of the invention.

In FIG. 1, 1 is a base plate, and 2 a set lever including an opening 2a and a bent portion 2b. The set lever 2 has a spring 3 connected thereto and urging set lever 2 to move rightwardly in FIG. 1. The set lever 2 is coupled to the pivotal movement of a take-up lever (not shown) and caused to move leftwardly against the biasing force of spring 3 as the film is advanced. 4 is a first locking lever including a claw 4a and a bent portion 4b and pivotally supported by a shaft or pin 5 connected to the base plate 1. The first locking lever 4 has a spring 6 connected thereto and biasing the first locking lever 4 to swing counterclockwise in FIG. 1. When the set lever 2 moves leftwardly, the claw 4a is received in the opening 2a to lock the set lever 2 in a set position.

7 is an exposure meter having a pointer 7a. 8 and 9 are a pointer holding lever, and a cam lever respectively both, of which are pivotally connected at one end thereof to the meter 7, the cam lever 9 having a stepped cam portion 9a and a cutout 9b. 11 is a control lever having a pin 11a, received in the cutout 9b and a bent portion 11b formed thereon with an inclined surface 11b' (See FIG. 2, the position and operation of the bent portion 11b is subsequently to be described). The control lever 11, which has further pins 11c, 11d and 11e is, mounted through a shaft or pin 12 on the base plate 1 for sliding movement. A spring 13 is connected to the control lever 11 to bias the same to move rightwardly. When the control lever moves rightwardly, it causes the pointer holding lever 8 and cam lever 9 to swing in the directions of arrows H and I respectively, so that the amount of its rightward movement or the amount of its displacement is regulated in response to the deflection of the pointer 7a.

14 is a second locking lever including arms 14a and 14b and pivotally supported by a shaft or pin 15 connected to the base plate 1. A spring 16 having a higher biasing force than spring 13 is connected to the second locking lever 14 to urge the same to swing counterclockwise in FIG. 1, so that arm 14a engages pin 11e to normally hold the control lever 11 in its leftmost position. 17 is a release lever having an offset portion 17a and a projection 17b, the offset portion 17a being adapted to engage the bent portion 4b of the first locking lever 4. The release lever 17 is supported for up-and-down sliding motion in FIG. 1 by pins 18 connected to the base plate 1, with its projection 17b normally engaging arm 14b of the second locking lever 14 to maintain the release lever 17 in its upper position.

19 is a flywheel having pins 19a, 19b and a pinion 19c and rotatably supported by a shaft 20 connected to the base plate 1. 21 is a claw lever having a claw 21a and pivotally supported by a shaft 22 connected to the bent portion 2b of the set lever 2. A spring 23 is connected to the claw lever 21 to normally urge the same to swing counterclockwise into engagement with a pin 24 attached to bent portion 2b. When the set lever 2 moves rightwardly, the claw 21a drives pin 19a to rotate the flywheel 19 counterclockwise in the direction of an arrow G. 25 is a shutter speed lever having a gear portion 25a and an arm 25b, the gear portion 25a being in meshing engagement with the pinion 19c. The shutter speed lever 25, which is pivotally supported by a shaft 26 connected to the base plate 1, has a spring 27 connected thereto which normally urges the lever 25 to swing counterclockwise into engagement with a fixed pin 28 to maintain the flywheel 19 in the illustrated normal position. When the flywheel 19 rotates upon release lever 17 being lowered, arm 25b is brought into engagement with pin 11d of the control lever 11 so as to thereby determine its own angle of rotation and hence the shutter speed. At the same time, this regulates the angle of rotation of the flywheel 19 in accordance with the deflection of the pointer 7a or set it at a value which is consistent with the brightness of an object to be photographed as will become evident from the following.

29 designates two diaphragm blades pivotally supported by a shaft 30 connected to a fixed part (not shown) of the camera, each of the blades being formed therein with a slot 29a which is disposed in an inclined position. 31 is a diaphragm lever having connected thereto pins 31a and 31b, pin 31a extending through the slots 29a formed in the diaphragm blades 29. The diaphragm lever 31 is pivotally supported by a shaft 32 connected to the base plate 1 and has a spring 32a connected thereto to urge the same to swing counterclockwise into engagement with pin 19b of the flywheel 19 as shown in its normal position. The diaphragm lever 31 regulates the size of the diaphragm opening formed by the diaphragm blades 29 according to the amount of its rotation counterclockwise from the normal position shown in FIG. 1.

33 is a diaphragm cam lever having arms 33a and 33b, the arm 33a being formed with a cam edge 33a' adapted to come into engagement with pin 31b of the diaphragm lever 31 and the arm 33b being formed therein with a forked portion 33b'. The diaphragm cam lever 33 is pivotally supported by shaft 20, and the forked portion 33b' receives therein pin 11c of control lever 11. When the flywheel 19 rotates counterclockwise and the control lever 11 moves rightwardly, the diaphragm cam lever 33 swings clockwise and the cam edge 33a' is brought into engagement with pin 31b of the control lever 31, thereby regulating the amount of rotation of the diaphragm lever 31 to determine the degree of opening of the diaphragm. 34 is a normally open flash contact which is adapted to be closed by engagement with pin 19a of the flywheel 19 as the angle of rotation of the latter increases when the brightness of the object is below a predetermined level, and makes shooting of the camera through exposure meter coupling impossible. 35 is an aperture for taking a picture of the object.

Figure 2:
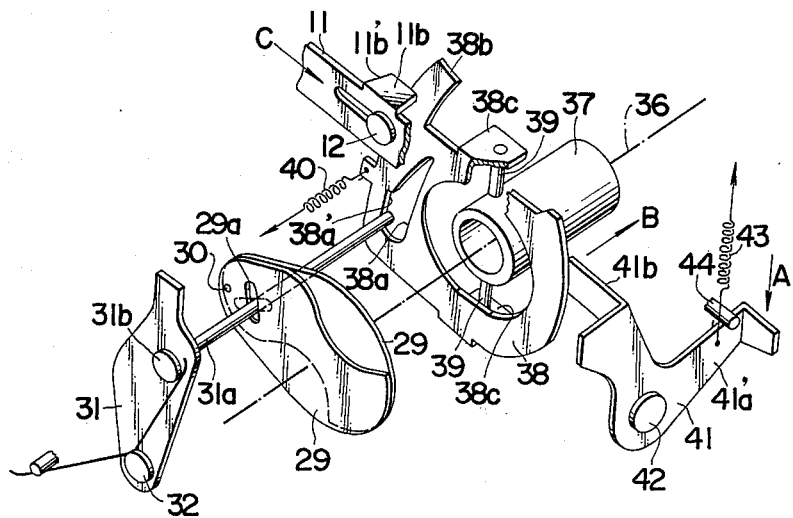
FIG. 2 is a perspective view of the shutter of FIG. 1, showing those parts which are coupled to the distance.

Referring to FIG. 2, 36 is an optical axis of a taking lens (not shown). 37 is a distance tube adapted to rotate about the optical axis 36 of the taking lens so as to cause the same to move back and forth to bring the camera into focus with the object.

38 is a distance cam plate formed with an opening 38a having a cam edge 38a', a projection 38b and upper and lower bent portions 38c as well as an opening 38d substantially coaxial with the optical axis 36. Shafts 39 are attached to the upper and lower bent portions 38c and rotatably connected at their inner ends to the distance tube 37, so that the plate 38 is swingable about the axis of shafts 39. The cam plate 38 has a spring 40 connected thereto to urge the same to swing counterclockwise. 41 is a flash lever having arms 41a and 41b and pivotally supported by a shaft 42 connected to an immovable part (not shown) of the camera. A spring 43, higher in biasing force than spring 40, is connected to the flash lever 41 to urge the same to swing counterclockwise.

The mechanism shown in FIG. 2 will now be described in detail. As shown, the flash lever 41 is in engagement with a stopper 44 attached to an immovable part of the camera (not shown). In this case, the distance cam plate 38 is maintained in a first position in which the diaphragm pin 31a is kept from entering into the cam opening 38a of the cam plate 38 by arm 41b normally in engagement with the cam 38. By mounting a light emitter (not shown) on a shoe (not shown) of the camera, the flash emitter can push by its leg, for example, arm 41a of the flash lever 41 in the direction of an arrow A. This causes the flash lever 41 to swing clockwise against the biasing force of spring 43, so that the cam plate 38 moves in pivotal motion in the direction of an arrow B into a second position by virtue of the biasing force of spring 40. This permits the diaphragm pin 31a to enter into the cam opening 38a because the latter moves toward the former, with a result that the throttle pin 31a can engage the cam edge 38a'. If the flash emitter is removed, then the flash lever 41 swings counterclockwise into the first position as shown in FIG. 2 by virtue of the biasing force of spring 43. Thus the diaphragm pin 31a is withdrawn from the cam opening 38a.

The bent portion 11b provided in the control lever 11, whose rightward position is determined in accordance with the deflection of the pointer 7a of the exposure meter 7, is maintained in engagement with the cam plate 38 or its projection 38b while the shutter can be worked by coupling to the exposure meter, so that the cam plate 38 is maintained in its first position. However, if the shutter cannot be worked by coupling to the exposure meter, the bent portion 11b is released from engagement with the projection 38b and allows the cam plate 38 to swing counterclockwise into its second position. The inclined surface 11b' of the bent portion 11b pushes the projection 38b and causes the same to swing clockwise to restore the cam plate 38 to its first position when the shutter is restored to a condition in which it can be worked by coupling to the exposure meter or the control lever 11 moves in a direction opposite to the direction of an arrow C to be restored to its original position upon completion of exposing of the film. Stated differently, the distance cam plate 38 is moved to its second position when the shutter cannot be worked by coupling to the exposure meter with a flash emitter being mounted on the camera, the cam plate 38 controlling the amount of movement of the diaphragm pin 31a when the former is in its second position so that the diaphragm stops down to provide an opening which is consistent with the distance between the camera and the object.

The shutter according to the invention is constructed as aforementioned. In FIG. 1, the shutter is in a condition in which it is set. If the release lever 17 is pressed, then the first locking lever 4 swings clockwise and unlocks the set lever 2 and, at the same time, causes the second locking lever 14 to swing clockwise as indicated by an arrow D. This allows the control lever 11 to move rightwardly in the direction of arrow E. Thus the control lever 11 moves rightwardly a distance which is consistent with the deflection of the meter pointer 7a, thereby causing the diaphragm cam lever 33 to swing clockwise an amount which is consistent with the brightness of the object.

On the other hand, upon being unlocked, the set lever 2 quickly moves rightwardly in the direction of arrow F by virtue of the biasing force of spring 3, with a result that the claw 21a of the claw lever 21 is brought into abutting engagement with pin 19a to thereby rotate the flywheel 19 counterclockwise. Thus pin 19b is released from engagement with the diaphragm lever 31, so that the pin 31b of diaphragm lever 31 is brought into engagement with the cam edge 33a' of the diaphragm cam lever 33 and the amount of its rotation is controlled by the diaphragm cam lever 33 when the brightness of the object is such that the shutter can be worked by coupling to the exposure meter. Then the diaphragm pin 31a drives the diaphragm blades 29 to stop down the diaphragm to provide a suitable diaphragm opening.

Figure 3:
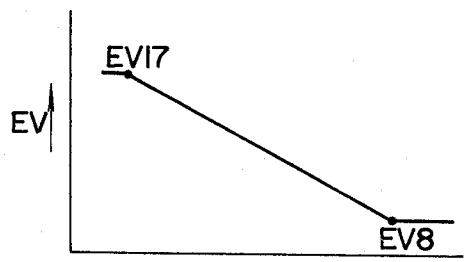
FIG. 3 is a graph showing the relation between the EV values and the angles of rotation of the flywheel.

When the flywheel 19 is rotated by the claw lever 21 as aforesaid, the shutter speed lever 25 is swung till arm 25b is brought into abutting engagement with pin 11d of the control lever 11. In the present invention, the relation between the angles of rotation of the flywheel 19 and the EV value is as shown in FIG. 3. Thus the shutter can give a programmed exposure in a range between EV 8 and EV 17.

In case the camera has mounted thereon a flash emitter, when the brightness of the object is such that the shutter cannot be worked by coupling to the exposure meter, or when the brightness is below EV 8 in value, the control lever 11 moves further rightwardly than when the brightness has a value EV 8, with a result that its bent portion 11b is released from engagement with the projection 38b on the cam plate 38. This brings the cam plate to its second position, so that the amount of rotation of the diaphragm lever 31 is not controlled by the diaphragm cam lever 33 but by the diaphragm pin 31a which is brought into engagement with the cam edge 38a' of cam plate 38. Thus the diaphragm blades 29 are driven to stop down and provide an opening which is consistent with a position defined by the cam edge 38a' of cam plate 38, and hence the distance between the camera and object. The shutter speed lever 25 swings clockwise in the direction of arrow G a greater distance than it would swing if the brightness had a value of EV 8 to set the shutter speed. At the same time, the flywheel 19 rotates counterclockwise a greater distance than it would if the brightness had a value of EV 8. This brings pin 19a into engagement with the flash contact 34, so that the flash emitter can be actuated to make the exposure in proper flash light.

What is claimed is:

1. A shutter for photographic cameras with a flash equipment including flash means adapted to be actuated by an electrical signal, said shutter comprising, in combination, diaphragm blade means operable to set the diaphragm aperture to a proper value in accordance with the brightness of an object to be photographed; blade drive means movable between a fixed position, in which said blade means is maintained in a closed position, and a variable position, in which said blade means is maintained in an open position; a fly wheel adapted to be driven from a first position to a second position, said fly wheel having an actuating pin means and stop means operable to maintain said blade drive means in its fixed position when said fly wheel is in its first position; means operable, responsive to release of said shutter, to engage said actuating pin means to drive said fly wheel; cam means operatively associated with said blade drive means and operable to set the variable position of said blade drive means properly in accordance with the brightness of the object; control lever means, movable responsive to release of said shutter, from a fixed position to a variable position which latter is determined in accordance with the brightness of the object, said control level means having pin means operable to set said cam means and to set said second position of said fly wheel; and means mounted in the path of movement of said actuating pin means for producing said electrical signal when said fly wheel rotates through an angle greater than a predetermined angle of rotation.

2. A shutter for photographic cameras, as claimed in claim 1, including a focusing member rotatable about an optical axis of the camera for bringing the camera into focus with the object; a second cam means mounted on said focusing member and movable between an operative position and an inoperative position, said second cam means being operable to set the variable position of said blade drive means properly, in accordance with the distance of the camera and object during flash-wise photographing, when in its operative position; and protuberance means secured to said control lever means and operatively associated with said second cam means, said protuberance means being operable to release said second cam means to move past a predetermined position correlated with the said variable position of said blade drive means.

3. A shutter for photographic cameras, as claimed in claim 2, including means operable to maintain said second cam means in its inoperative postion when a detachable flash emitter is not mounted on said camera.

* * * * *